(12) United States Patent
Adragna (10) Patent No.: US 10,171,003 B1
(45) Date of Patent: Jan. 1, 2019

(54) CONTROLLING A SWITCHING RESONANT CONVERTER

(71) Applicant: STMICROELECTRONICS S.R.L., Agrate Brianza (IT)

(72) Inventor: Claudio Adragna, Monza (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 15/937,081

(22) Filed: Mar. 27, 2018

(51) Int. Cl.
*H02M 3/335* (2006.01)
*H02M 7/53862* (2007.01)
*H02M 1/08* (2006.01)
*H02M 1/00* (2006.01)

(52) U.S. Cl.
CPC ......... *H02M 3/33569* (2013.01); *H02M 1/08* (2013.01); *H02M 2001/0009* (2013.01)

(58) Field of Classification Search
CPC ............... H02M 3/335; H02M 1/4241; H02M 3/33569; H02M 2007/4815; H02M 2007/4818; H02M 7/53846; H02M 7/53862; Y02B 70/1416; Y02B 70/1433; Y02B 70/1441
See application file for complete search history.

(56) References Cited

U.S. PATENT DOCUMENTS

| 8,451,629 | B2 | 5/2013 | Adragna | |
|---|---|---|---|---|
| 8,576,583 | B2 | 11/2013 | Choi | |
| 8,699,240 | B2 | 4/2014 | Adragna et al. | |
| 8,804,377 | B2 | 8/2014 | Adragna et al. | |
| 2008/0198638 | A1* | 8/2008 | Reinberger | H02M 3/3376 363/74 |
| 2009/0196074 | A1* | 8/2009 | Choi | H02M 3/337 363/21.02 |
| 2009/0257251 | A1* | 10/2009 | Su | H02M 3/33523 363/21.15 |
| 2010/0202167 | A1* | 8/2010 | Yang | H02M 3/3376 363/26 |
| 2017/0179833 | A1 | 6/2017 | Adragna | |

* cited by examiner

*Primary Examiner* — Gary L Laxton
(74) *Attorney, Agent, or Firm* — Seed IP Law Group LLP (57) ABSTRACT

A method and a controller for controlling a converter are provided. In the method and controller, a capacitance is charged simultaneously using a first current and a second current that is different than the first current or discharged simultaneously using the first current and the second current. Sourcing and sinking transistors source or sink the first current for charging or discharging the capacitance. An operational transconductance amplifier determines a level of the second current based on a level of current flowing through the resonant tank. The operational transconductance amplifier sources or sinks the second current for charging or discharging the capacitance. Further, logic is provided to output a switching signal for operating the converter based on a voltage across the capacitance.

20 Claims, 7 Drawing Sheets

CONTROLLING A SWITCHING RESONANT CONVERTER

BACKGROUND

Technical Field

This application is directed to a method and a controller for controlling a switching resonant converter, and, in particular, a method and a controller that mitigates the effect of converter and resonant tank properties on control operations.

Description of the Related Art

The switching resonant converter is in a class of DC-DC converters that includes a primary side resonant tank and secondary side output rectification. Typical control techniques for switching resonant converters are output level responsive, whereby the output voltage or a signal representative of the output voltage is fed back to a controller for dictating switching operations. In addition, some control techniques utilize controlled capacitance charging and discharging for deriving switching timing. Some conventional techniques for controlling switching resonant converters are prone to asymmetries in primary side and secondary side currents. In addition, some conventional techniques positively reinforce disturbances in the resonant converters.

BRIEF SUMMARY

In an embodiment, a system includes a converter including a transformer having a primary winding in a primary side of the transformer and a secondary winding in a secondary side of the transformer. The converter includes a resonant tank in the primary side. In an embodiment, a controller includes: a capacitance configured to be charged simultaneously using a first current and a second current that is different than the first current or discharged simultaneously using the first current and the second current, sourcing and sinking transistors configured to source or sink the first current for charging or discharging the capacitance, an operational transconductance amplifier configured to determine a level of the second current based on a level of current flowing through the resonant tank, and source or sink the second current for charging or discharging the capacitance, and logic configured to output a switching signal for operating the converter based on a voltage across the capacitance.

In an embodiment, the logic is configured to determine whether the voltage across the capacitance is below a first voltage threshold or exceeds a second voltage threshold, in response to determining that the voltage across the capacitance is below the first voltage threshold, assert the switching signal, and in response to determining that the voltage across the capacitance exceeds the second voltage threshold, deassert the switching signal.

In an embodiment, the controller includes a peak reference voltage generation stage configured to generate a first voltage that is proportional to a duration of a switching cycle of the switching signal, sum the first voltage and the first voltage threshold and set the second voltage threshold to the sum of the first voltage and the first voltage threshold.

In an embodiment, the controller includes a biasing circuit configured to receive a voltage representative of an input voltage of the converter, generate, based on the voltage representative of the input voltage of the converter, a biasing current for biasing the operational transconductance amplifier, and output the biasing current to the operational transconductance amplifier. In an embodiment, the biasing circuit is configured to generate the biasing current to be proportional to the input voltage of the converter. In an embodiment, the operational transconductance amplifier is configured to determine the level of the second current to be proportional to the biasing current. In an embodiment, the sourcing and sinking transistors are configured to source or sink the first current that is representative of an output voltage of the converter.

In an embodiment, a controller for operating a converter includes: a capacitance configured to be charged or discharged using a first current and a second current that is different than the first current, sourcing and sinking transistors configured to source or sink the first current for charging or discharging the capacitance, an operational transconductance amplifier configured to determine a level of the second current based on a level of current flowing through a resonant tank of the converter, and sink or source the second current for charging or discharging the capacitance and logic configured to output a switching signal for operating the converter based on a voltage across the capacitance.

In an embodiment, the logic is configured to determine whether the voltage across the capacitance is below a first voltage threshold or exceeds a second voltage threshold, in response to determining that the voltage across the capacitance is below the first voltage threshold, assert the switching signal, and in response to determining that the voltage across the capacitance exceeds the second voltage threshold, deassert the switching signal. In an embodiment, the controller includes a peak reference voltage generation stage configured to: generate a first voltage that is proportional to a duration of a switching cycle of the switching signal of the converter, sum the first voltage and first voltage threshold, and set the second voltage threshold to the sum of the first voltage and the first voltage threshold.

In an embodiment, the controller includes a biasing circuit configured to receive a voltage representative of an input voltage of the converter, generate, based on the voltage representative of the input voltage of the converter, a biasing current for biasing the operational transconductance amplifier, and output the biasing current to the operational transconductance amplifier. In an embodiment, the biasing circuit is configured to generate the biasing current to be proportional to the input voltage of the converter. In an embodiment, the operational transconductance amplifier is configured to determine the level of the second current to be proportional to the biasing current. In an embodiment, the sourcing and sinking transistors are configured to source or sink the first current that is representative of an output voltage of the converter.

In an embodiment, a method includes sourcing or sinking, by one or more transistors, a first current for charging or discharging a capacitance. In an embodiment, the capacitance is operable to store a charge for dictating a timing of switching a converter. In an embodiment, a method includes determining, by an operational transconductance amplifier, a level of a second current based on a level of current flowing through a resonant tank of the converter and sinking or sourcing, by the operational transconductance amplifier, the second current for charging or discharging the capacitance. In an embodiment, a method includes detecting voltage across the capacitance and outputting, by logic, a switching signal for operating the converter based on the voltage across the capacitance.

In an embodiment, a method includes determining whether the voltage across the capacitance is below a first voltage threshold or exceeds a second voltage threshold, in response to determining that the voltage across the capacitance is below the first voltage threshold, asserting the switching signal, and in response to determining that the voltage across the capacitance exceeds the second voltage threshold, deasserting the switching signal.

In an embodiment, a method includes generating a first voltage that is proportional to a duration of a switching cycle of the switching signal of the converter, summing the first voltage and first voltage threshold, and setting the second voltage threshold to the sum of the first voltage and the first voltage threshold. In an embodiment, a method includes receiving a voltage representative of an input voltage of the converter, generating, based on the voltage representative of the input voltage of the converter, a biasing current for biasing the operational transconductance amplifier, and outputting the biasing current to the operational transconductance amplifier. In an embodiment, the biasing current is proportional to the input voltage of the converter.

DETAILED DESCRIPTION

Figure 1:
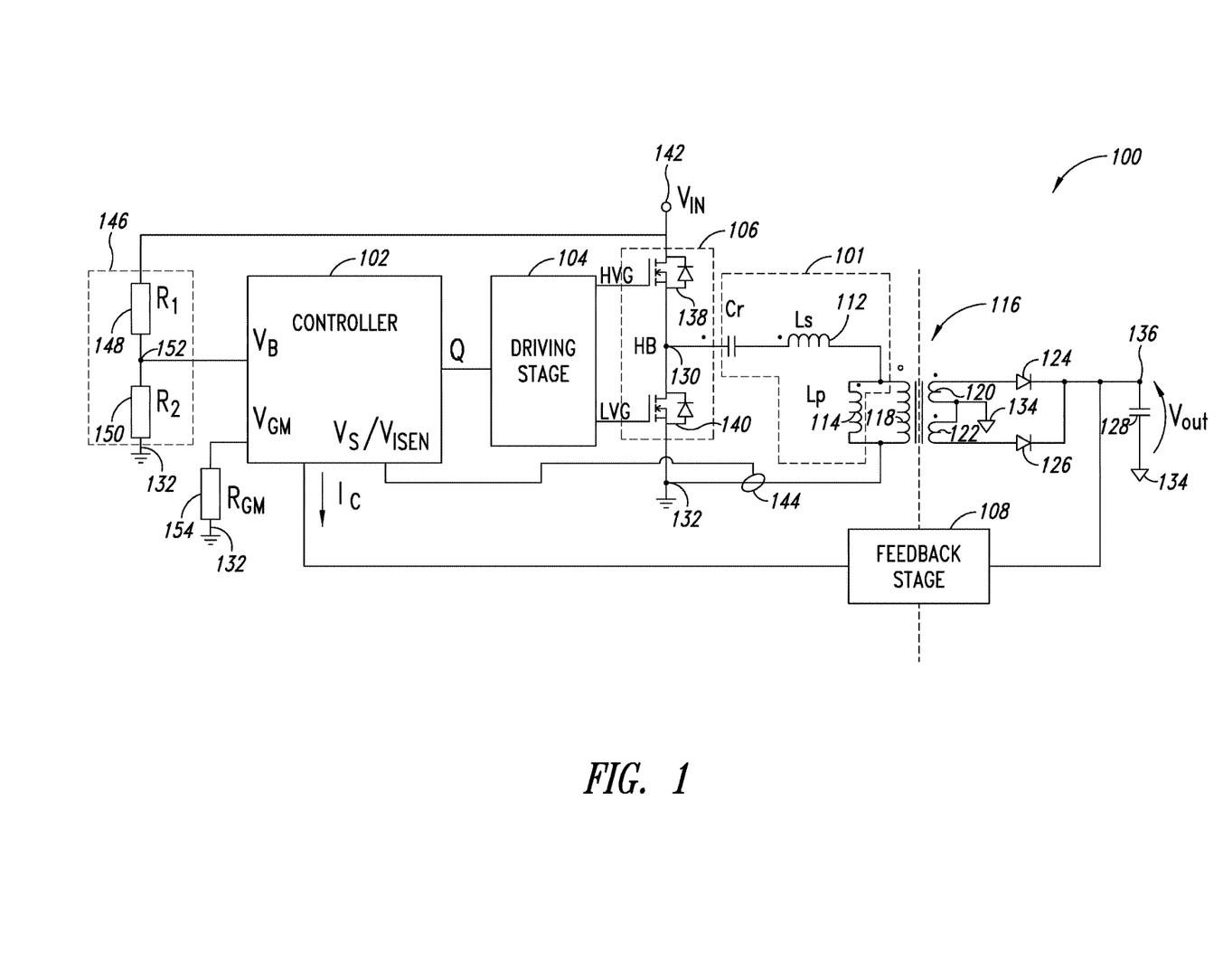
FIG. 1 shows a circuit diagram of an LLC resonant converter coupled to control stages of the converter.

FIG. 1 shows a circuit diagram of an LLC resonant converter 100 coupled to control stages of the converter 100. The control stages include a controller 102, a driving stage 104 and a feedback stage 108. The LLC resonant converter 100 includes a switching stage 106 and a resonant tank 101 having two inductances (a resonant inductance 112 (denoted as 'Ls') and a shunt inductance 114 (denoted as 'Lp')) and one capacitance (a resonant capacitance 110 (denoted as 'Cr')). The converter 100 also includes a transformer 116 having a primary winding 118 in a primary side of the converter 100 (and the transformer 116). The primary winding 118 and the primary side are galvanically isolated from two secondary windings of a secondary side. The two secondary windings include a first secondary winding 120 and a second secondary winding 122. The converter 100 also includes a first diode 124, a second diode 126 and an output capacitance 128.

The resonant capacitance 110 has a first side coupled to a half bridge node 130 (denoted as 'HB') of the switching stage 106. The resonant capacitance 110 has a second side coupled to a first terminal of the resonant inductance 112. The resonant inductance 112 has a second terminal coupled to both a first terminal of the shunt inductance 114 and a first terminal of the primary winding 118. The shunt inductance 114 and the primary winding 118 each have second terminals that are coupled to each other and together coupled to a primary side reference voltage node 132. The primary side reference voltage node 132 may be a ground node of the primary side.

The transformer's 116 secondary side is center-tapped. The first secondary winding 120 and the second secondary winding 122 each have first terminals that are coupled to each other and to a secondary side reference voltage node 134. The first secondary winding 120 has a second terminal coupled to an anode of the first diode 124. The second secondary winding 122 has a second terminal coupled to an anode of the second diode 126. The first and second diodes 124, 126 each have cathodes that are coupled to an output voltage node 136. The output capacitance 128 is coupled between the output voltage node 136 and the secondary side reference voltage node 134, which may be a ground node.

The feedback stage 108, which may be an isolated feedback stage, such as an optocoupler, has an input coupled to the output voltage node 136 and an output coupled to the controller 102. The feedback stage 108 outputs, to the primary side, a signal (current $I_C$) representative of the output voltage while maintaining the galvanic isolation between the primary and secondary sides.

The switching stage 106 includes a first transistor 138 and a second transistor 140. Although the first and second transistors 138, 140 are shown as n-channel metal-oxide-semiconductor field-effect transistors (MOSFETs), it is noted that the first and second transistors 138, 140 may be any other type of transistor or switch. The first transistor 138 has a source coupled to an input voltage node 142, a drain coupled to the half bridge node 130 and a gate for receiving a high side gate drive signal (denoted as 'HVG') from the driving stage 104. The input voltage node 142 supplies an input voltage ($V_{IN}$) to the converter 100 via the first transistor 138. The second transistor 140 has a source coupled to the half bridge node 130, a drain coupled to the primary side reference voltage node 132 and a gate for receiving a low side gate drive signal (denoted as 'LVG') from the driving stage 104.

The driving stage 104 has an input coupled to an output of the controller 102. The driving stage receives a switching signal (Q) from the controller 102. The switching signal has on and off states, which are also referred to as activated and deactivated states, respectively, and asserted and deasserted states, respectively. The driving stage 104 determines the states of the high side gate drive signal and the low side gate drive signal based on the switching signal received from the controller 102. The driving stage 104 then generates the high side and low side gate drive signals and outputs the high side and low side gate drive signals to the converter 100.

The controller 102 generates the switching signal (Q) based on various feedback signals. The control techniques described herein rely on one or more of the plurality of feedback signals for controlling the converter 100. The controller 102 receives the current ($I_C$) representative of the output voltage ($V_{OUT}$) of the converter 100. The controller 102 is also coupled to a primary side current sensing stage 144. The primary side current sensing stage 144 may include a sense resistance coupled to the primary side reference voltage node 132. The controller receives a voltage (referred to as Vs and $V_{ISEN}$) representative of the primary side current or the current of the resonant tank 101, for example at an input pin of the controller 102. The voltage (Vs or $V_{ISEN}$) representative of the primary side current or the current of the resonant tank 101 may be available externally to the controller 102. The controller 102 controls operation of the converter 100 based on the current representative of the output voltage and the voltage representative of the primary side current.

It is noted that although the current ($I_C$) is described herein as being representative of the output voltage ($V_{OUT}$) of the converter 100, in various embodiments, the current ($I_C$) may be representative of the output current ($I_{OUT}$) of the converter 100. In some applications, such light emitting diodes (LEDs), the converter 100 delivers a regulated output current to a load rather than a regulated output voltage ($V_{OUT}$). In such embodiments, the control loop operates to maintain a constant output current ($I_{OUT}$), and the control current ($I_C$) is, therefore, representative of the output current ($I_{OUT}$).

It is noted that the controlled output parameter (whether voltage or current) may be of no moment to the control techniques provided herein. The current ($I_C$) may be representative of either the output voltage or the output current (i.e., whichever output parameter is to be controlled).

It is noted that sensing may also be carried out in other ways, such as through a capacitive or resistive divider, or a current transformer or Hall sensor, among others, to provide a voltage signal accurately representative of the instantaneous current flowing in the resonant tank circuit.

In an embodiment, the controller 102 controls operation of the converter 100 based on a voltage ($V_B$) representative of the input voltage ($V_{IN}$) of the converter 100. As shown in FIG. 1, the controller 102 has an input coupled to an intermediary node 152 of a voltage divider 146. The voltage divider 146 includes a first resistance 148 (denoted as $R_1$) and a second resistance 150 (denoted as $R_2$). The first and second resistances 148, 150 each have a first terminal coupled to the intermediary node 152. The first resistance 148 has a second terminal coupled to the input voltage node 142, and the second resistance 150 has a second terminal coupled to the primary side reference voltage node 132. The voltage divider 146 scales the input voltage, whereby the voltage ($V_B$) representative of the input voltage ($V_{IN}$) is sensed at the intermediary node 152.

The controller 102 has an input node coupled to a gain resistance 154. The gain resistance may be user-configurable. The voltage ($V_B$) representative of the input voltage ($V_{IN}$) may be filtered and applied to the gain resistance 154 to produce a bias current for operating the controller 102.

The controller 102 generates the switching signal (Q) based on one or more of the feedback signals. The controller 102 outputs of switching signal to the driving stage 104, which in turn generates the high side and low side gate drive signals based on the switching signal. The high side and low side gate drive signals are in phase opposition, whereby if the high side gate drive signal (HVG) is asserted, the low side gate drive signal (LVG) is deasserted, and vice-versa. When the high side gate drive signal is asserted, the input voltage ($V_{IN}$) is supplied to the first side of the resonant capacitance 110 to drive the resonant tank 101. When the low side gate drive signal is asserted, the primary side reference voltage, which may be ground voltage, is supplied to the first side of the resonant capacitance 110 to drive the resonant tank 101. When the resonant tank 101 is driven, energy in the primary side is transferred by the transformer 116 to the secondary side.

In the secondary side, the first and second diode's 124, 126 perform full-wave rectification that produces the output voltage ($V_{OUT}$) at the output voltage node 136. The output capacitance 128 buffers and stabilizes the output voltage ($V_{OUT}$) A load (not shown) may be coupled between the output voltage node 136 and the secondary side reference voltage node 134. The load is thereby driven by the output voltage ($V_{OUT}$).

It is noted that although the transformer 116 is shown to include two secondary winding 120, 122, in various embodiments others configurations of the transformer 116 (and the converter 100) may be used. For Example, a single secondary winding may be used together with a full bridge diode rectification in the secondary side of the converter 100.

Figure 2:
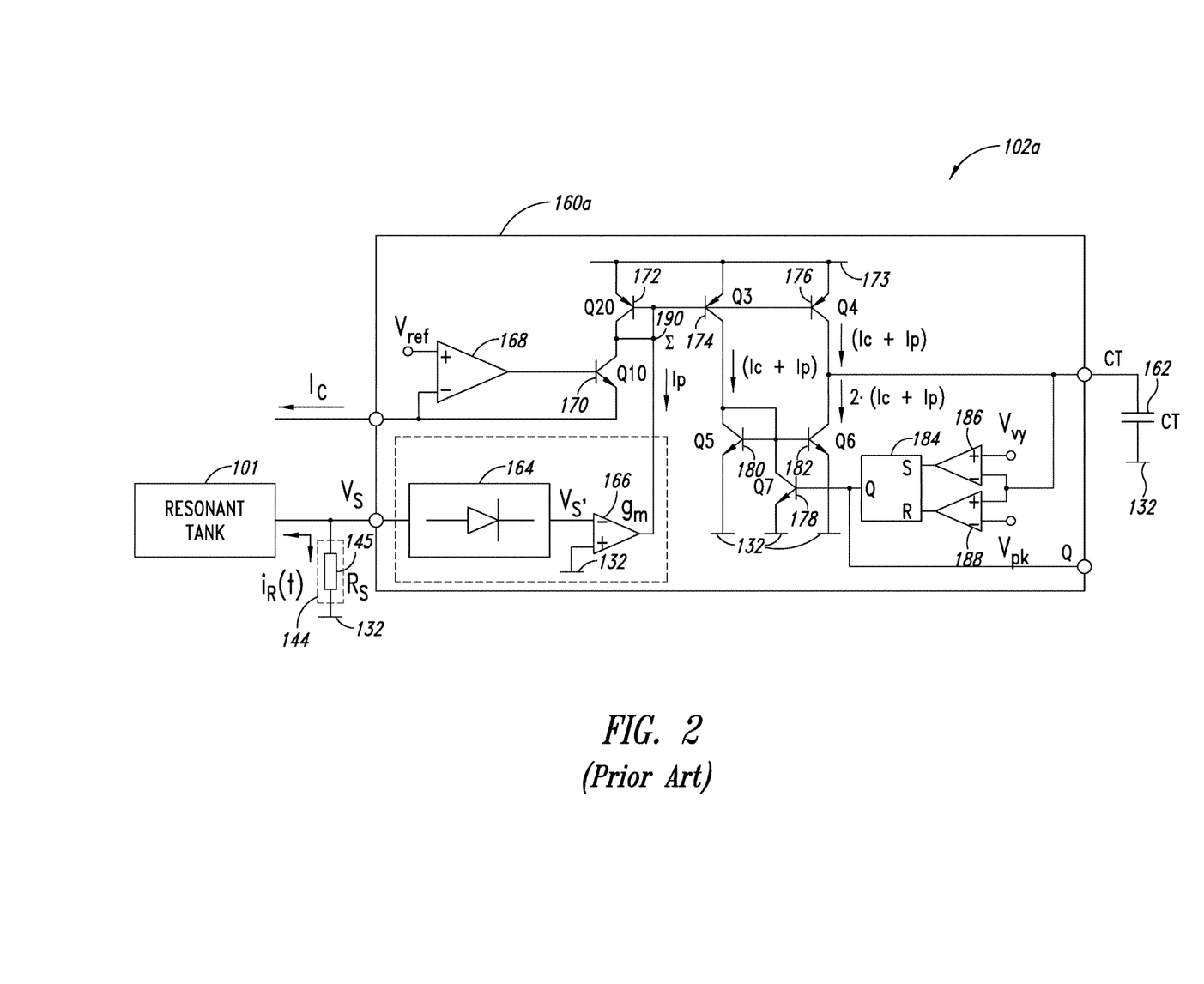
FIG. 2 shows a schematic of a conventional controller.

FIG. 2 shows a schematic of a conventional controller. The controller 102a controls the converter 100 in accordance with charge mode control (CMC). The controller 102a has an integrated circuit (IC) portion 160a and a timing capacitance 162. The integrated circuit portion 160a may be a semi-conductor chip of the controller 102a. Although the timing capacitance 162 is shown to be outside the integrated circuit portion 160a, in some embodiments of the timing capacitance 162 may be part of the integrated circuit portion 160a.

The controller 102a includes a full-wave rectifier 164 and an operational transconductance amplifier 166. The controller 102a also includes an operational amplifier 168, a first transistor 170 and first, second and third current sourcing transistors 172, 174, 176. Further, the controller 102a includes a second transistor 178, first and second current sinking transistors 180, 182, a flip-flop 184 and first and second comparators 186, 188. Although the transistors 170, 172, 174, 176, 178, 180, 182 are shown to be bipolar junction transistors (BJTs), it is noted that any other type of transistor or switch may be used.

The full-wave rectifier 164 has an input for receiving the voltage (Vs) representative of the resonant tank current and an output coupled to an inverting input of the operational transconductance amplifier 166. In FIG. 2, the current sensing stage 144 is shown to include a sense resistance 145 (denoted as 'Rs') having a first side coupled to the input of the full-wave rectifier 164 and a second side coupled to the primary side reference voltage node 132. The voltage (Vs) representative of the resonant tank current is taken at the first side of the sense resistance 145. The operational transconductance amplifier 166 also has a noninverting input coupled to the primary side reference voltage node 132 and an output coupled to a summing node 190 (denoted as 'Σ').

The operational amplifier 168 has an inverting input coupled to the output of the feedback stage 108 described with reference to FIG. 1 and an non-inverting input configured to receive a reference voltage (Vref). The operational amplifier 168 has an output coupled to a base of the first transistor 170. The first transistor 170 has a collector coupled to the summing node 190 and an emitter coupled to the inverting input of the operational amplifier 168.

The first current sourcing transistor 172 has an emitter coupled to a supply line 173 and a base and a collector that are cross-coupled and together coupled to the summing node 190. The second and third current sourcing transistors 174, 176 each have an emitter coupled to the supply line 173 and a base coupled to the summing node 190.

The first current sinking transistor 180 has a collector and a base that are cross-coupled and together coupled to the collector of the second current sourcing transistor 174. The first current sinking transistor 180 has an emitter coupled to the primary side reference voltage node 132.

The second transistor 178 has a collector coupled to both the base and the collector of the first current sinking transistor 180. The second transistor 178 has an emitter coupled to the primary side reference voltage node 132. The second current sinking transistor 182 has a base coupled to the both base and collector of the first current sinking transistor 180. The second current sinking transistor 182 has a collector coupled to the collector of the third current sourcing transistor 176 and an emitter coupled to the primary side reference voltage node 132.

The timing capacitance 162 has a first side coupled to both the collector of the third current sourcing transistor 176 and the collector of the second current sinking transistor 182. The timing capacitance 162 has a second side coupled to the primary side reference voltage node 132. The first comparator 186 has an inverting input coupled to the first side of the timing capacitance 162, a noninverting input configured to receive a valley reference voltage (Vv) for the voltage across the timing capacitance 162 and an output coupled to a setting terminal of the flip-flop 184. The second comparator 188 has a noninverting input coupled to the second side of the timing capacitance 162, an inverting input configured to receive a peak reference voltage (Vpk) for the voltage across the timing capacitance 162 and an output coupled to the resetting terminal of the flip-flop 184. In addition to the setting and resetting terminals, the flip-flop 184 has an output terminal coupled to the base of the second transistor 178. The output terminal of the flip-flop 184 is a non-complementary output terminal. The output terminal is also coupled to the input of the driving stage 104 described with reference to FIG. 1. The flip-flop 184 outputs the switching signal (Q) to the driving stage 104 as described herein. It is noted that the valley reference voltage (Vv) and the peak reference voltage (Vpk), which are threshold voltages of the timing capacitance 162, may be obtained using a sample-and-hold circuit.

The full-wave rectifier 164 receives the voltage (Vs) representative of the resonant tank current at its input. The full-wave rectifier 164 rectifies the voltage and outputs a rectified voltage (Vs'). The resonant tank current ($i_R(t)$) can flow in either direction in the resonant tank 101. Accordingly, the voltage (Vs) can be positive or negative in sign depending on the direction of the resonant tank current ($i_R(t)$). The rectified voltage (Vs') has positive or zero values, where negative values of the voltage (Vs) representative of the resonant tank current are mirrored to become positive.

The operational transconductance amplifier 166 has a gain ($g_m$). The operational transconductance amplifier 166 receives the rectified voltage (Vs') at its inverting input and receives the primary side reference voltage (for example, ground voltage) at its noninverting input. The operational transconductance amplifier 166 outputs (or sinks) a current ($I_P$) representative of a difference between the primary side reference voltage and the rectified voltage (Vs'). Because the rectified voltage is non-negative, the difference between the reference voltage and the rectified voltage is non-positive. Accordingly, the operational transconductance amplifier 166 does not source current and is either neutral or sinks current. The current ($I_P$) that is sunk by the operational transconductance amplifier 166 is positively correlated with the rectified voltage (Vs') due to the comparison operation performed by the operational transconductance amplifier 166.

The summing node 190 aggregates the current ($I_P$) output by the operational transconductance amplifier 166 and the current ($I_C$) representative of the output voltage ($V_{OUT}$) that is received from the feedback stage 108. The second and third current sourcing transistors 174, 176 mirror the aggregate current ($I_C+I_P$). The timing capacitance 162 receives the aggregate current from the collector of the third current sourcing transistor 176. The timing capacitance 162 is charged using the aggregate current.

The second current sinking transistor 182 discharges the timing capacitance 162. The second current sinking transistor 182 discharges using a sinking current ($2(I_C+I_P)$) that is twice the aggregate current. Accordingly, the charge of the timing capacitance 162 is a symmetrical waveform with equal charging and discharging times.

The rectification provided by the full-wave rectifier 164 positively reinforces perturbations in the converter 100. The full-wave rectifier 164 mirrors negative voltages and only outputs positive or zero voltages. Accordingly, perturbations that occur in one switching cycle of the converter 100 propagate to subsequent switching cycles with the same sign. If the gain of the controller 102*a* is greater than one, a disturbance in the controller 102*a* or the converter 100 reinforces itself from one cycle to the next. This propagation may cause the duty cycle of the converter to become unbalanced. That is particularly the case in light load conditions, where the current of the resonant tank 101 is asymmetrical in relation to the current of the secondary side. As a consequence, the asymmetry leads to uneven thermal stress on the rectifying the diodes 124, 126 of the secondary side. The uneven thermal stress reduces the reliability of the converter 100.

In an embodiment, the full-wave rectifier 164 is dispensed with. Instead, a voltage that is positively correlated with (or proportional to) the instantaneous resonant tank current is provided directly to an operational transconductance amplifier 164. Removal of full-wave rectification, removes the positive reinforcement of disturbances exhibited during operation of the controller 102*a*.

Figure 3:
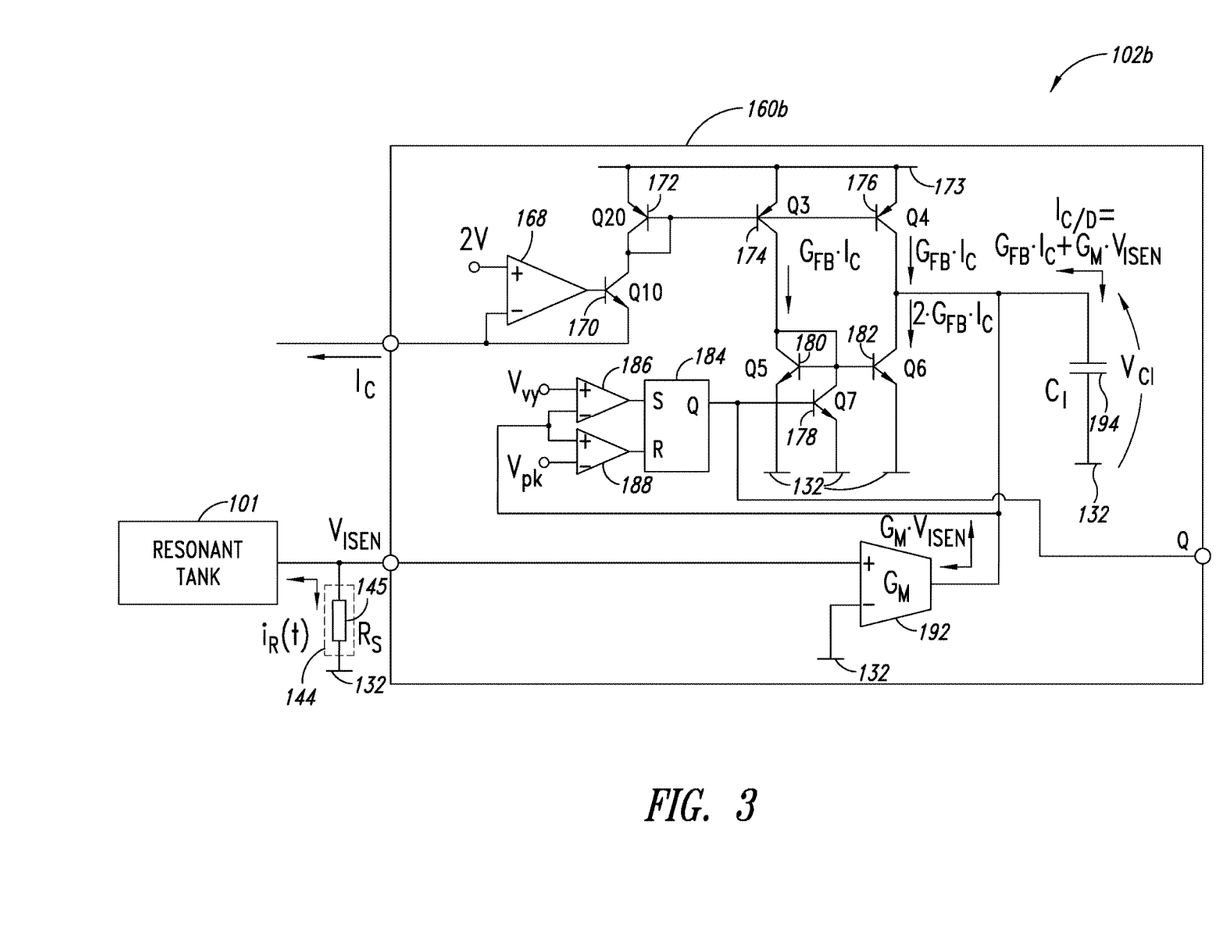
FIG. 3 shows a schematic of the controller in accordance with an embodiment of the present disclosure.

FIG. 3 shows a schematic of the controller 102*b* in accordance with an embodiment of the present disclosure. Similar elements of the controller 102*b* as those of the controller 102*a* described with reference to FIG. 2 have the same reference numerals. The controller 102*b* includes an integrating capacitance 194 (denoted as '$C_I$'). The integrating capacitance 194 replaces the timing capacitance 162 of the controller 102*a* described with reference to FIG. 2. The integrating capacitance 194 has a first side coupled to the collectors of both the third current sourcing transistor 176 and the second current sinking transistor 182 for charging and discharging the integrating capacitance 194, respectively. The integrating capacitance 194 has a second side coupled to the primary side reference voltage node 132.

Although the integrating capacitance 194 is shown in FIG. 3 to be in the integrated circuit portion 160*b* of the controller 102*b*, the integrating capacitance 194 may also be outside of the integrated circuit portion 160*b*. The integrating capacitance 194 may, for example, be user-configurable and connected via a pin to the integrated circuit portion 160*b*. Depending on the input and output pin constraints of the controller 102*b*, the integrating capacitance 194 may be in or outside of the integrated circuit portion 160*b*.

The controller 102*b* includes an operational transconductance amplifier 192 having a gain of $G_M$. Similar to the operational transconductance amplifier 166 of the controller 102*a* of FIG. 2, the operational transconductance amplifier 192 has an inverting terminal coupled to the primary side reference voltage node 132. However, the operational transconductance amplifier 192 has a noninverting input for receiving, from the current sensing stage 144, the voltage (denoted as '$V_{ISEN}$') representative of the current of the resonant tank 101. The operational transconductance amplifier 192 has an output coupled to the first side of the integrating capacitance 194.

The operational transconductance amplifier 192 may have an internal level shifter. The internal level shifter may shift the voltages received at the inverting and noninverting inputs of the amplifier 192. The internal level shifter enables the amplifier 192 to operate on negative voltages in addition to positive voltages. Due to the level shifting capability of the amplifier 192, the amplifier 192 may receive and operate on the voltage ($V_{ISEN}$) representative of the current of the resonant tank 101, whose voltage range spans both negative and positive values to represent both directions of current flow in the resonant tank 101. It is noted that the resonant tank current has zero average value.

The operational transconductance amplifier 192 sinks or sources current, at its output, that is positively correlated with $V_{ISEN}$. In particular, the current is represented as the product of the voltage ($V_{ISEN}$) and the gain ($G_M$) of the operational transconductance amplifier 192. Due to the capability of the operational transconductance amplifier 192 to both the sink and source current at its output, the output of the operational transconductance amplifier 192 is coupled directly to the first side of the integrating capacitance 194 for charging or discharging the integrating capacitance 194 based on the voltage representative of the current through the resonant tank 101.

Further, use of the summing node 190 for aggregating current is dispensed with. The current ($I_C$) representative of the output voltage ($V_{OUT}$) is sunk and sourced, in phase with the output current of the amplifier 192 that is sunk or sourced too. Accordingly, the third current sourcing transistor 176 is used to charge the integrating capacitance 194 with current that is positively correlated with the current ($I_C$). Further, the second current sinking transistor 182 is used to discharge the integrating capacitance 194 of the current charged using the current sourcing transistors 172, 174, 176. The operational transconductance amplifier 192 charges and discharges the integrating capacitance 194 with current that is positively correlated with the voltage ($V_{ISEN}$). The sourcing transistor 176, simultaneously with the operational transconductance amplifier 192, charges the integrating capacitance 194. The sinking transistor 182, simultaneously with the operational transconductance amplifier 192, discharges the integrating capacitance 194. The operational transconductance amplifier 192 charges and discharges the integrating capacitance 194 independently of the sourcing and sinking transistors 176, 182. It is noted that in the controller 102b, the reference voltage (Vref) is set to and shown to be 2V but in various embodiments any other voltage level may be used for buffering by the operational amplifier 168.

The output current of the operational transconductance amplifier 192 may be represented as:

$$G_M V_{ISEN} = G_M R s i_R(t) \quad \text{Equation (1)}.$$

The charge/discharge current of the integrating capacitance 194 is the sum of the output current of the operational transconductance amplifier 192 and the sourcing current of the third current sourcing transistor 176 or the sinking current of the second current sinking transistor 182. The charge/discharge current of the integrating capacitance 194 is represented as:

$$I_{CID} = G_{FB} I_C + G_M V_{ISEN} \quad \text{Equation (2)},$$

where $G_{FB}$ is a feedback gain of the controller 102b.

The voltage swing across the integrating capacitance 194 over a duration of half a switching cycle period ($T_{sw}$) of the converter 100 is represented as:

$$\Delta V_{CI} = \frac{1}{C_I} \int_0^{\frac{T_{SW}}{2}} [G_{FB} I_C + G_M R s i_R(t)] dt \quad \text{Equation (3)}$$

$$= \frac{T_{SW}}{C_I} \left[ \frac{1}{2} G_{FB} I_C + G_M R s \frac{1}{T_{SW}} \int_0^{\frac{T_{SW}}{2}} i_R(t) dt \right]$$

$$= \frac{T_{SW}}{2 C_I} (G_{FB} I_C + 2 G_M R s I_{in}),$$

where $I_{in}$ is the average input current for the converter 100. By solving for the current ($I_C$), the current ($I_C$) may be represented as:

$$I_C = \frac{2}{G_{FB}} \left( C_I \frac{\Delta V_{CI}}{T_{SW}} - G_M R s I_{in} \right). \quad \text{Equation (4)}$$

Accordingly, controlling the converter 100 using the current ($I_C$) representative of the output voltage amounts to controlling the converter 100 based on the switching cycle period ($T_{sw}$) (and consequently, the ON time) as well as the current ($I_{in}$) of the converter 100. The controller 102b, thus, performs charge mode control (CMC) like the controller 102a described with reference to FIG. 2. However, removal of the full-wave rectifier 164 alleviates the instability resulting from resonant tank current asymmetry. Further, positive reinforcement of perturbations exhibited by the full-wave rectifier 164 is also mitigated while retaining the same type of control. The charge mode control of FIG. 3 is sensitive to input voltage and input current as well as resonant tank design, parameters and tolerance as exhibited by the dependence on the switching cycle period ($T_{sw}$).

Figure 4:
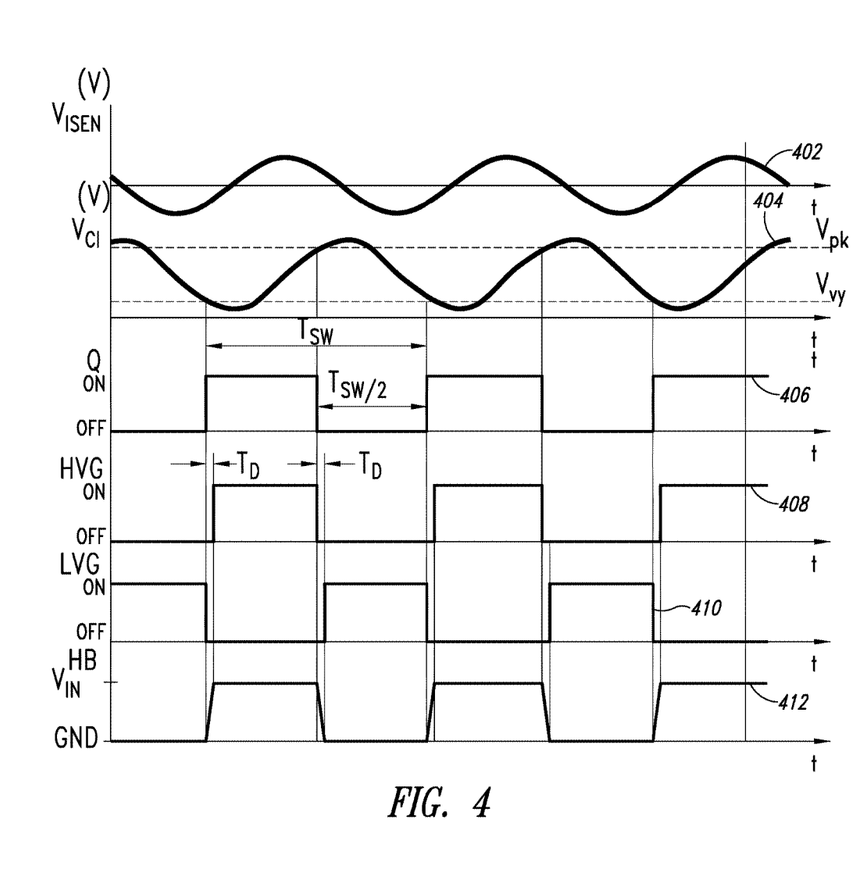
FIG. 4 shows diagrams of signals of the controller described with reference to FIG. 3.

Both controllers 102a, 102b use the current ($I_C$) representative of the output voltage for controlling the converter 100. However, the use and arrangement of the operational transconductance amplifier 192 in the controller 102b results in mitigating the instabilities and perturbations of the charge mode control of the controller 102a FIG. 4 shows diagrams of signals 402-412 of the controller 102b described with reference to FIG. 3. FIG. 4 shows the voltage representative of the resonant tank current 402, the voltage across the integrating capacitance 404, the switching signal 406, the high side gate drive signal 408, the low side gate drive signal 410 and the voltage of the half bridge node 412. The voltage representative of the resonant tank current 402 spans both negative and positive values and is used for charging and discharging the integrating capacitance 194. When the voltage of the integrating capacitance 404, which may be measured across both plates or sides of the integrating capacitance 194, reaches the valley reference voltage (Vvy), the controller 102b asserts switching signal 406 to start the switching cycle period ($T_{sw}$). As described herein, the driving stage 104 receives the switching signal 406. The driving stage 104 delays the switching signal 406 by a dead-time ($T_D$).

The dead-time ($T_D$) is a time interval in which both the first and second transistors 138, 140 (or switches) are off. The driving stage 104 inserts the dead-time ($T_D$) in response to the edges of the switching signal (Q), for example, when one of the transistors 138, 140 turns off. Inserting the dead-time ($T_D$) allows the voltage of the half bridge node 130 (412) to swing during the dead-time ($T_D$). Thus, the other one of the transistors 138, 140 turns on with essentially zero drain-to-source voltage in a soft-switching technique.

After the dead-time ($T_D$), the driving stage 104 asserts the high side gate drive signal 408 such that the high side gate drive signal 408 is asserted a length of the dead-time ($T_D$)

after assertion of the switching signal 406. In response to assertion of the switching signal 406, the driving stage 104 also deasserts the low side gate drive signal 410.

When the voltage of the integrating capacitance 404 reaches the peak reference voltage (Vpk), the controller 102b deasserts the switching signal 406 and retains the switching signal 406 in the deasserted state until the voltage of the integrating capacitance 404 drops to the valley reference voltage (Vvy). In response to deassertion of the switching signal 406, the driving stage 104 deasserts the high side gate drive signal 408. Further, in response to the assertion of the switching signal 406, the driving stage 104 waits for the duration of the dead-time ($T_D$) and upon expiration of the dead-time ($T_D$), the driving stage 104 asserts the low side gate drive signal 410. The low side gate drive signal 410 remains in the asserted state until the switching cycle ends and the switching signal 406 transitions to the asserted state. As a result of the assertion and deassertion of the high side and low side gate drive signals 408, 410, the voltage of the half bridge node 412 alternates between the input voltage ($V_{IN}$) and the primary side reference voltage.

In an embodiment, the dependence of the controller 102b on the duration of the switching cycle period ($T_{sw}$) is mitigated or removed by making the voltage swing across the integrating capacitance ($\Delta V_{CI}$) a function of the switching cycle period. As described herein, the voltage swing across the integrating capacitance is a difference between the peak reference voltage (Vpk) and the valley reference voltage (Vvy). For example, if the voltage swing across the integrating capacitance ($\Delta V_{CI}$) is proportional to the switching cycle period, control of the converter 100 is no longer dependent on the switching cycle period.

The controller 102b uses fixed or predetermined peak reference voltage (Vpk) and the valley reference voltage (Vvy) reference voltages to identify a duration of the switching cycle period and the timing of charging and discharging the integrating capacitance 194. If at least one of the peak reference voltage (Vpk) and the valley reference voltage (Vvy) is made dependent on the duration of the switching cycle period ($T_{sw}$), then dependence on the duration of the switching cycle period is removed as described herein.

Figure 5:
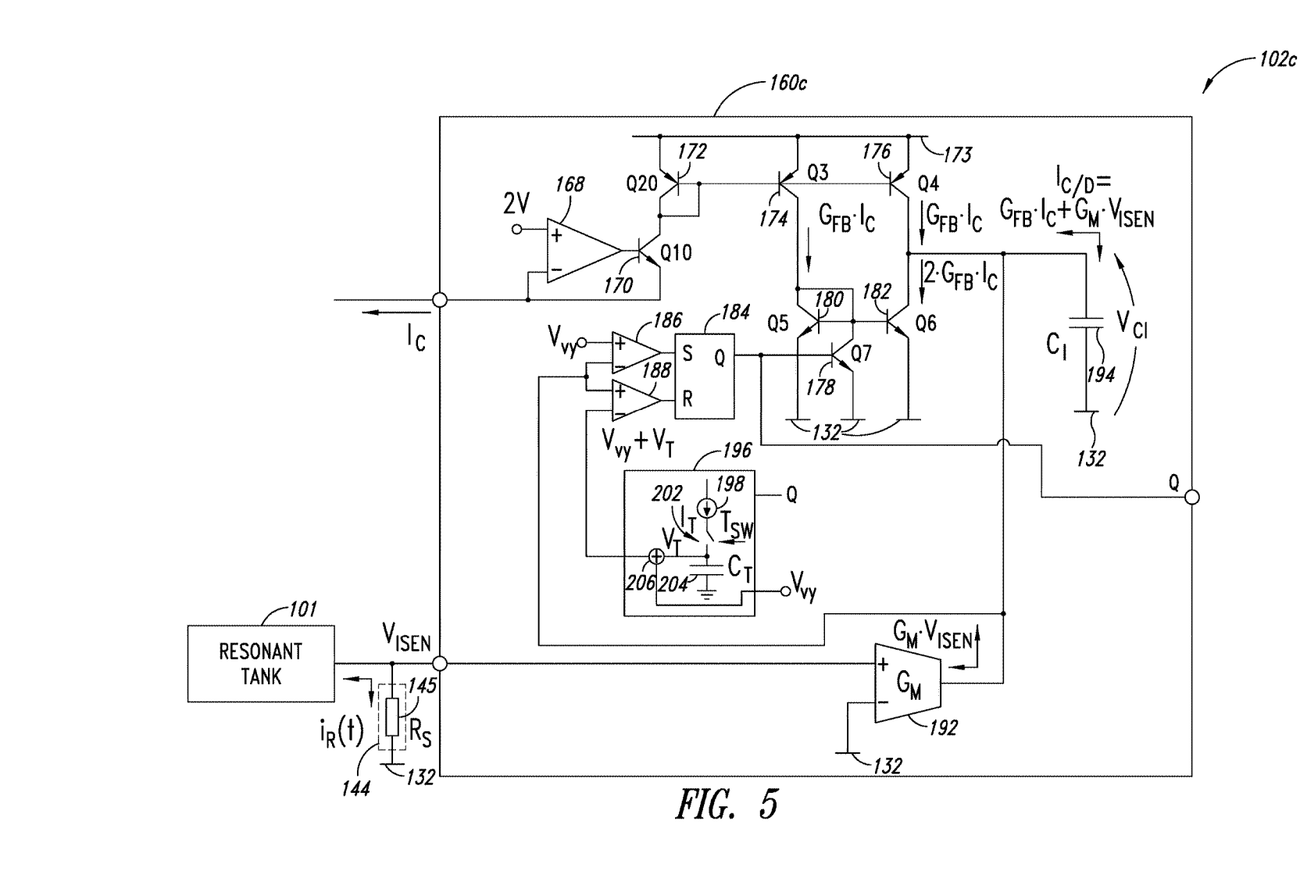
FIG. 5 shows a schematic of the controller in accordance with an embodiment of the present disclosure.

FIG. 5 shows a schematic of the controller 102c in accordance with an embodiment of the present disclosure. Similar elements of the controller 102c as those of the controller 102b described with reference to FIG. 3 have the same reference numerals. The controller 102b includes an integrated circuit portion 160c having a peak reference voltage generation stage 196. The peak reference voltage generation stage 196 dynamically generates the peak reference voltage (Vpk) to be dependent on the switching cycle period ($T_{sw}$).

The peak reference voltage generation stage 196 has an input coupled to the output of the flip-flop 184. The peak reference voltage generation stage 196 has an output coupled to the inverting input of the second comparator 188. The peak reference voltage generation stage 196 receives the valley reference voltage (Vvy) and the switching signal. The peak reference voltage generation stage 196 generates the peak reference voltage (Vpk) based on the valley reference voltage (Vvy) and the switching signal.

A simplified schematic of the peak reference voltage generation stage 196 for illustrative purposes is shown in FIG. 5. Schematically, the peak reference voltage generation stage 196 includes a current source 198 that outputs a current ($I_T$), a switch 202, a timing capacitance ($C_T$) 204 and a voltage adder 206. During the switching cycle period ($T_{sw}$), the current source 198 charges the timing capacitance 204 with the current ($I_T$). Thus, the change of the timing capacitance 204 is proportional the switching cycle period. The voltage ($V_T$) across the timing capacitance 204 is then summed with the valley reference voltage (Vvy) to dynamically generate the peak reference voltage (Vpk).

It is noted that $I_T$ may be externally programmable with a circuit arrangement akin to that used to source the current $I_C$. For example, an internal buffer that provides an accurate voltage on a pin and an external resistor connected between the pin to and ground may be used to define a current that is internally mirrored to obtain $I_T$.

The peak reference voltage generation stage 196 may be synchronized to the switching signal (Q) and to the switching of the half bridge node 412. The peak reference voltage generation stage 196 outputs the voltage Vpk used as the reference by the second comparator 188 that resets the flip-flop 184. Other techniques for implementing the peak reference voltage generation stage 196 as a time may be used.

The peak reference voltage (Vpk) generated by the peak reference voltage generation stage 196 is represented as:

$$Vpk = Vvy + V_T = Vvy + \frac{I_T}{C_T} T_{SW}. \quad \text{Equation (5)}$$

Thus, the voltage swing across the integrating capacitance 194, which is the difference between the peak reference voltage (Vpk) and the valley reference voltage (Vvy), is represented as:

$$\Delta V_{CI} = Vpk - Vvy = (Vvy + V_T) - Vvy = V_T = \frac{I_T}{C_T} T_{SW}. \quad \text{Equation (6)}$$

Achieving a proportionality between the voltage swing across the integrating capacitance 194 and the switching cycle period ($\Delta V_{CI} \propto T_{sw}$) can be achieved in other ways. For example, the ramp might be reset at Vvy (instead of zero), which eliminates the need for offsetting $V_T$. Further, Vpk could be kept constant and Vvy changed. The ramp might be sampled (and reset) at every transition of the signal Q, thus measuring $T_{sw}/2$ and the synchronization signal might not be Q but any other logic signal inside the control device that is synchronous to Q and then able to provide the same time information. The timer of the peak reference voltage generation stage 196 might be a digital counter and a DAC and may generate either Vpk or Vvy. All such variations fall within the scope of the present disclosure.

By substituting the voltage swing across the integrating capacitance 194 in Equation (4), the current ($I_C$) may be represented as:

$$I_C = \frac{2}{G_{FB}} \left( I_T \frac{C_I}{C_T} - G_M R s I_{in} \right). \quad \text{Equation (7)}$$

The control per Equation (7) is average current mode control (ACMC). With the exception of the average input current ($I_{in}$), the constants and variables of Equation (7) are associated with the controller 102c rather than the resonant tank 101. Thus, controlling the converter 100 using the current ($I_C$) representative of the output voltage ($V_{OUT}$) is largely decoupled from properties of the converter 100 (with the exception of dependence on the average input current ($I_{in}$)).

Equation (7) specifies that the current ($I_C$) representative of the output voltage is a function of the product of: the gain ($G_M$) of the operational transconductance amplifier 192, the sense resistance 145 and the average input current ($I_{in}$). Thus, if the gain ($G_M$) of the operational transconductance amplifier 192 is made to be inversely proportional to the average input current ($I_{in}$), then the dependence of the current ($I_C$) representative of the output voltage on the average input current ($I_{in}$) is removed. Taking this measure, control of the converter 100 (based on the current ($I_C$)) is tantamount to controlling the converter 100 independently of resonant tank 101 and converter 100 parameters. The gain ($G_M$) of the operational transconductance amplifier 192 is a function of the bias current supplied to the operational transconductance amplifier 192.

Figure 6:
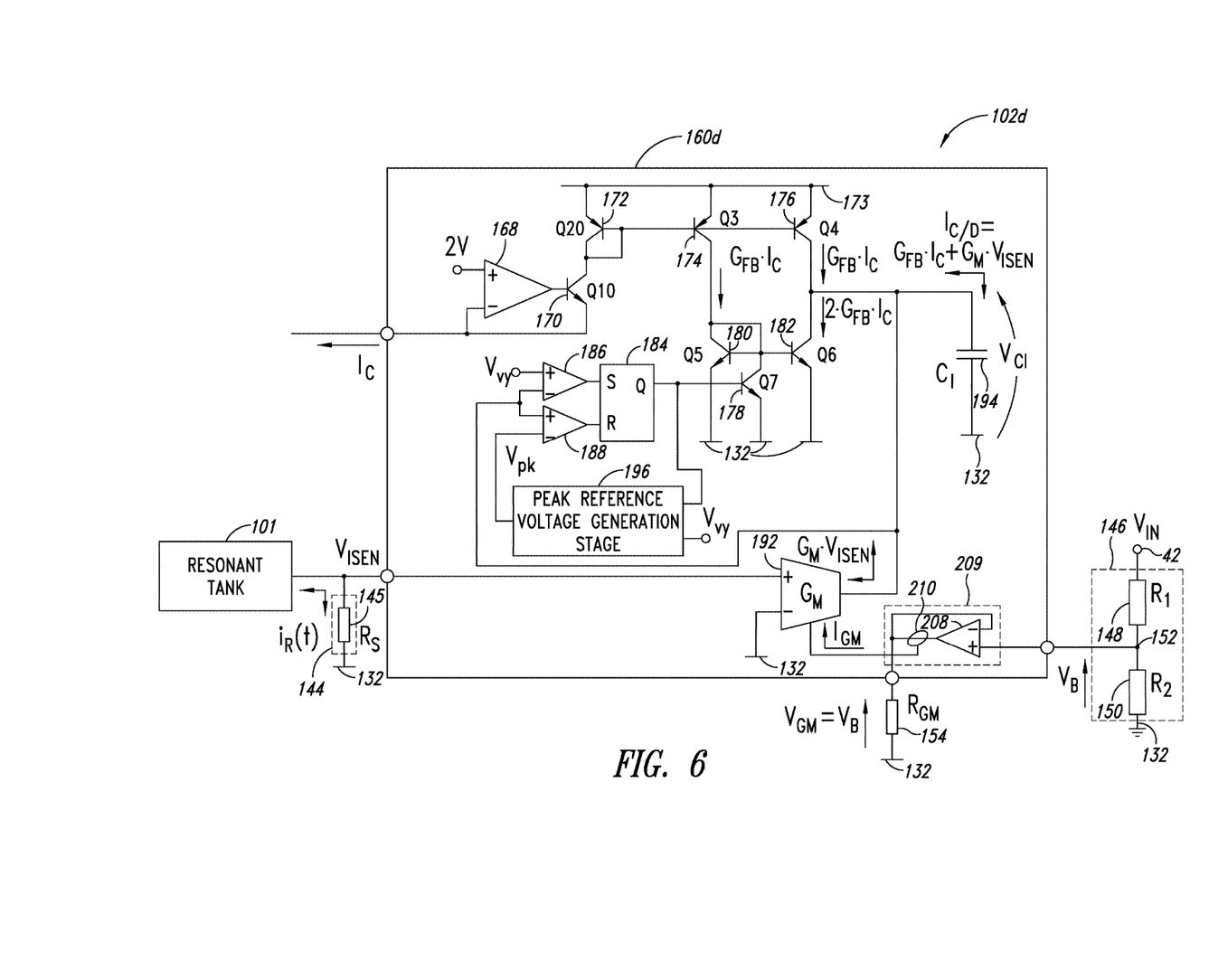
FIG. 6 shows a schematic of the controller in accordance with an embodiment of the present disclosure.

FIG. 6 shows a schematic of the controller 102d in accordance with an embodiment of the present disclosure. Similar elements of the controller 102d as those of the controller 102c described with reference to FIG. 5 have the same reference numerals. The controller 102d includes an integrated circuit portion 160d having a biasing circuit 209. The biasing circuit 209 includes an operational amplifier 208 and a sensing stage 210. The operational transconductance amplifier 192 has a bias current terminal as shown in FIG. 6. The operational amplifier 208 supplies a bias current ($I_{GM}$) to the bias current terminal of the operational transconductance amplifier 192.

In contrast to the controllers 102a, 102b, 102c, the controller 102d uses the input node coupled to the intermediary node 152 of the voltage divider 146 and the input node coupled to a gain resistance 154 described with reference to FIG. 1. It is noted that although the voltage divider 146 and the gain resistance 154 are shown outside the integrated circuit portion 160d, they may be in the integrated circuit portion 160d. Configuring the controller 102d to have elements outside the integrated circuit portion 160d that are coupled via controller terminals or pins allows the control to be user-configurable. However, depending on the availability or scarcity of controller 102d input/output pins, elements may be within or outside the integrated circuit portion 160d.

The operational amplifier 208 has a non-inverting input coupled to the intermediary node 152 of the voltage divider 146. The operational amplifier 208 has an inverting input and an output that are cross-coupled and together coupled to a first terminal of the gain resistance 154, whereby a second terminal of the gain resistance 154 is coupled to the primary side reference voltage node 132.

The biasing circuit 209 includes a sensing stage 210 having an input coupled to the output of the operational amplifier 208. The sensing stage 210 has an output coupled to the bias current terminal of the operational transconductance amplifier 192. The sensing stage 210 may include a sense resistance (not shown) coupled between the output of the operational amplifier 208 and the primary side reference voltage node 132.

The voltage divider 146 divides the input voltage ($V_{IN}$) and outputs a divided voltage ($V_B$) representative of the input voltage ($V_{IN}$) at the intermediary node 152. Coupling the output of the operational amplifier 208 to the gain resistance 154 makes the divided voltage ($V_B$) available at the pin to which the gain resistance 154 is coupled.

The gain ($G_M$) of the operational transconductance amplifier 194 is proportional to the bias current received from the sensing stage 210. The gain ($G_M$) of the operational transconductance amplifier 194 may be represented as:

$$G_M = \Gamma_M \frac{V_B}{R_{GM}}, \quad \text{Equation (8)}$$

where $\Gamma_M$ is a proportionality constant of the operational transconductance amplifier 194 and $R_{GM}$ is the gain resistance 154. The divided voltage ($V_B$) can be represented as:

$$V_B = V_{in} \frac{R_2}{R_1 + R_2} = V_{in} K_P, \quad \text{Equation (9)}$$

where $K_p$ is a scaling factor of the voltage divider 146. The scaling factor is a ratio of the second resistance 150 of the voltage divider 146 to a sum of the first and second resistances 148, 150.

Thus, the gain ($G_M$) of the operational transconductance amplifier 194 may be represented as:

$$G_M = \frac{\Gamma_M K_P}{R_{GM}} V_{in}, \quad \text{Equation (10)}$$

which may be substituted in Equation (7) to yield:

$$I_C = \frac{2}{G_{FB}} \left( I_T \frac{C_I}{C_T} - R_S \frac{\Gamma_M K_P}{R_{GM}} V_{in} I_{in} \right) \quad \text{Equation (11)}$$
$$= \frac{2}{G_{FB}} \left( I_T \frac{C_I}{C_T} - R_S \frac{\Gamma_M K_P}{R_{GM}} P_{in} \right).$$

where $P_{in}$ is the input power to the converter 100 represented as the product of the input voltage and the input current.

The controller 102d controls the converter 100 independently of resonant tank parameters. The parameters affecting the current ($I_C$) used to control the converter per Equation (11) are tuning parameters (such as the gain resistance 154 ($R_{GM}$), the sense resistance 145 (Rs) and the scaling factor of the voltage divider 146 ($K_p$)) external to both the controller and the converter 100 and matchable or tunable parameters of the controller 102d (such as the timing capacitance 204 ($C_T$), integrating capacitance 194 ($C_I$) and current ($I_T$) output of the current source 198). It is noted that the input power to the converter 100 is an input power of a power source of the converter 100 rather than a converter 100 or resonant tank 101 property.

Figure 7:
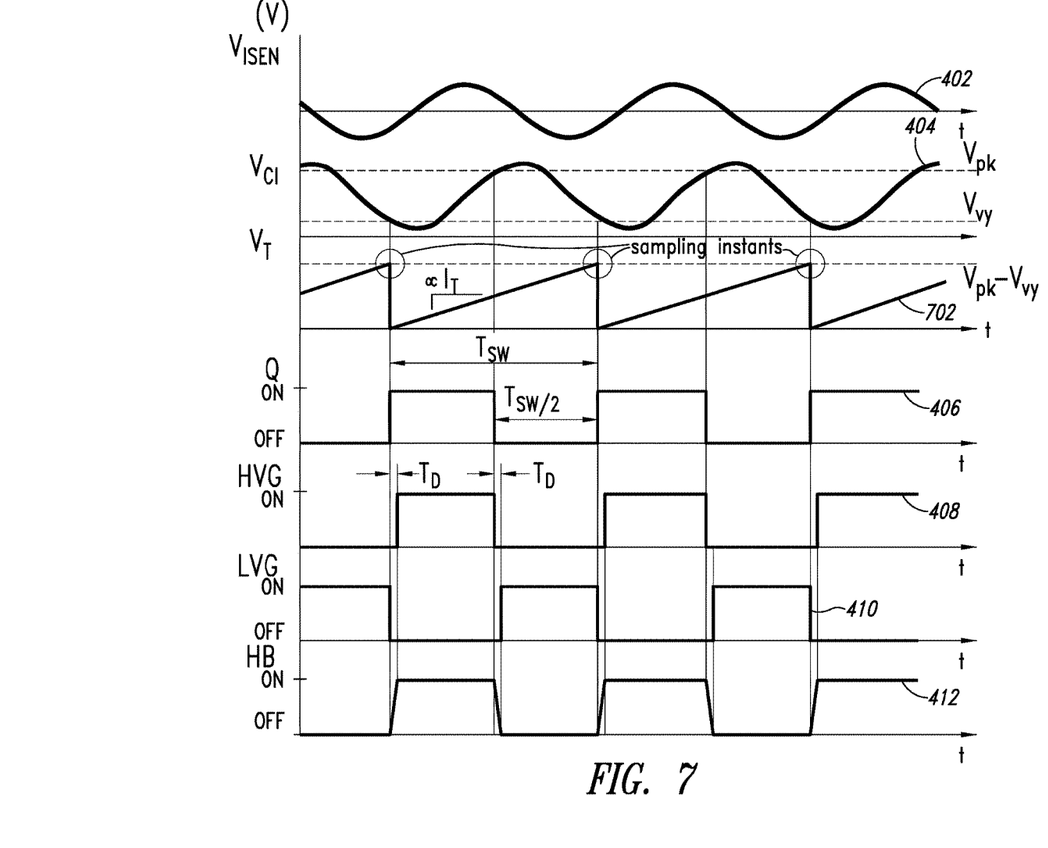
FIG. 7 shows diagrams of signals of the controller described with reference to FIG. 6.

FIG. 7 shows diagrams of signals 402-412, 702 of the controller 102d described with reference to FIG. 6. The signals include the voltage representative of the resonant tank current 402, the voltage of the integrating capacitance 404, the voltage of the timing capacitance of the peak reference voltage generation stage 702, the switching signal 406, the high side gate drive signal 408, the low side gate drive signal 410 and the voltage of the half bridge node 412.

The voltage ($V_T$) of the timing capacitance 702 is reset at the start of the switching cycle period ($T_{sw}$) and linearly increases over the duration of and in relation to the switching cycle. A slope of the voltage of the timing capacitance 702 is a function of the current ($I_T$) output by the current source 198 of the peak reference voltage generation stage 196.

At the end of the switching cycle, the voltage of the timing capacitance 702 reaches its maximum value. The voltage of the timing capacitance 702 is aggregated with the valley reference voltage (Vvy) to produce the peak reference voltage (Vpk). Similar to the operation described with reference to FIG. 4, when the voltage of the integrating capacitance 404 reaches the valley reference voltage (Vvy), the controller 102d asserts switching signal 406 to start the switching cycle period ($T_{sw}$) again. The driving stage 104 described with reference to FIG. 1 receives the switching signal 406. The driving stage 104 asserts the high side gate drive signal 408 and deasserts the low side gate drive signal 410.

When the voltage of the integrating capacitance 404 reaches the peak reference voltage (Vpk) (determined by the peak reference voltage generation stage 196), the controller 102d deasserts the switching signal 406 and retains the switching signal 406 in the deasserted state until the voltage of the integrating capacitance 404 drops to the valley reference voltage (Vvy). As described herein, the valley reference voltage (Vvy) may be predetermined and set to a first voltage threshold. Conversely, the peak reference voltage (Vpk), which is a second voltage threshold, is dynamically determined based on the switching cycle period of the converter 100.

In response to deassertion of the switching signal 406, the driving stage 104 deasserts the high side gate drive signal 408 and asserts the low side gate drive signal 410. The low side gate drive signal 410 remains in the asserted state until the switching cycle ends and the switching signal 406 transitions to the asserted state. As a result of the assertion and deassertion of the high side and low side gate drive signals 408, 410, the voltage of the half bridge node 412 alternates between the input voltage ($V_{IN}$) and the primary side reference voltage.

Although explicit reference has been made to LLC resonant converters herein, the techniques described herein may be used to control any other resonant converter, such as LCC, LLCC, and the like. Similarly, although explicit reference has been made to a half-bridge configuration, the techniques described herein may be used in converters using a full-bridge configuration.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a converter including a transformer having a primary winding in a primary side of the transformer and a secondary winding in a secondary side of the transformer, the converter including a resonant tank in the primary side; and
a controller including:
a capacitance configured to be charged simultaneously using a first current and a second current that is different than the first current or discharged simultaneously using the first current and the second current;
sourcing and sinking transistors configured to source or sink the first current for charging or discharging the capacitance;
an operational transconductance amplifier configured to determine a level of the second current based on a level of current flowing through the resonant tank, and source or sink the second current for charging or discharging the capacitance; and
logic configured to output a switching signal for operating the converter based on a voltage across the capacitance.

2. The system of claim 1, wherein the logic is configured to:
determine whether the voltage across the capacitance is below a first voltage threshold or exceeds a second voltage threshold;
in response to determining that the voltage across the capacitance is below the first voltage threshold, assert the switching signal; and
in response to determining that the voltage across the capacitance exceeds the second voltage threshold, deassert the switching signal.

3. The system of claim 2, wherein the controller includes a peak reference voltage generation stage configured to:
generate a first voltage that is proportional to a duration of a switching cycle of the switching signal;
sum the first voltage and the first voltage threshold; and
set the second voltage threshold to the sum of the first voltage and the first voltage threshold.

4. The system of claim 1, wherein the controller includes a biasing circuit configured to:
receive a voltage representative of an input voltage of the converter;
generate, based on the voltage representative of the input voltage of the converter, a biasing current for biasing the operational transconductance amplifier; and
output the biasing current to the operational transconductance amplifier.

5. The system of claim 4, wherein the biasing circuit is configured to generate the biasing current to be proportional to the input voltage of the converter.

6. The system of claim 4, wherein the operational transconductance amplifier is configured to determine the level of the second current to be proportional to the biasing current.

7. The system of claim 1, wherein the sourcing and sinking transistors are configured to source or sink the first current that is representative of an output voltage of the converter.

8. A controller for operating a converter, comprising:
a capacitance configured to be charged or discharged using a first current and a second current that is different than the first current;
sourcing and sinking transistors configured to source or sink the first current for charging or discharging the capacitance;
an operational transconductance amplifier configured to determine a level of the second current based on a level of current flowing through a resonant tank of the converter, and sink or source the second current for charging or discharging the capacitance; and
logic configured to output a switching signal for operating the converter based on a voltage across the capacitance.

9. The controller of claim 8, wherein the logic is configured to:

determine whether the voltage across the capacitance is below a first voltage threshold or exceeds a second voltage threshold;

in response to determining that the voltage across the capacitance is below the first voltage threshold, assert the switching signal; and in response to determining that the voltage across the capacitance exceeds the second voltage threshold, deassert the switching signal.

10. The controller of claim 9, comprising:

a peak reference voltage generation stage configured to:
generate a first voltage that is proportional to a duration of a switching cycle of the switching signal of the converter;
sum the first voltage and first voltage threshold; and
set the second voltage threshold to the sum of the first voltage and the first voltage threshold.

11. The controller of claim 8, comprising:

a biasing circuit configured to:
receive a voltage representative of an input voltage of the converter;
generate, based on the voltage representative of the input voltage of the converter, a biasing current for biasing the operational transconductance amplifier; and
output the biasing current to the operational transconductance amplifier.

12. The controller of claim 11, wherein the biasing circuit is configured to generate the biasing current to be proportional to the input voltage of the converter.

13. The controller of claim 11, wherein the operational transconductance amplifier is configured to determine the level of the second current to be proportional to the biasing current.

14. The controller of claim 8, wherein the sourcing and sinking transistors are configured to source or sink the first current that is representative of an output voltage of the converter.

15. The controller of claim 8, wherein the sourcing and sinking transistors are configured to source or sink the first current that is representative of an output current of the converter.

16. A method, comprising:

sourcing or sinking, by one or more transistors, a first current for charging or discharging a capacitance, the capacitance being operable to store a charge for dictating a timing of switching a converter;

determining, by an operational transconductance amplifier, a level of a second current based on a level of current flowing through a resonant tank of the converter;

sinking or sourcing, by the operational transconductance amplifier, the second current for charging or discharging the capacitance;

detecting voltage across the capacitance; and outputting, by logic, a switching signal for operating the converter based on the voltage across the capacitance.

17. The method of claim 16, comprising:

determining whether the voltage across the capacitance is below a first voltage threshold or exceeds a second voltage threshold;

in response to determining that the voltage across the capacitance is below the first voltage threshold, asserting the switching signal; and in response to determining that the voltage across the capacitance exceeds the second voltage threshold, deasserting the switching signal.

18. The method of claim 17, comprising:

generating a first voltage that is proportional to a duration of a switching cycle of the switching signal of the converter;

summing the first voltage and first voltage threshold; and setting the second voltage threshold to the sum of the first voltage and the first voltage threshold.

19. The method of claim 16, comprising:

receiving a voltage representative of an input voltage of the converter;

generating, based on the voltage representative of the input voltage of the converter, a biasing current for biasing the operational transconductance amplifier; and outputting the biasing current to the operational transconductance amplifier.

20. The method of claim 19, wherein the biasing current is proportional to the input voltage of the converter.

* * * * *